April 8, 1958  J. BORTHWICK  2,829,622
APPARATUS FOR USE IN SHEARING SHEEP
Filed Dec. 14, 1956  2 Sheets-Sheet 1
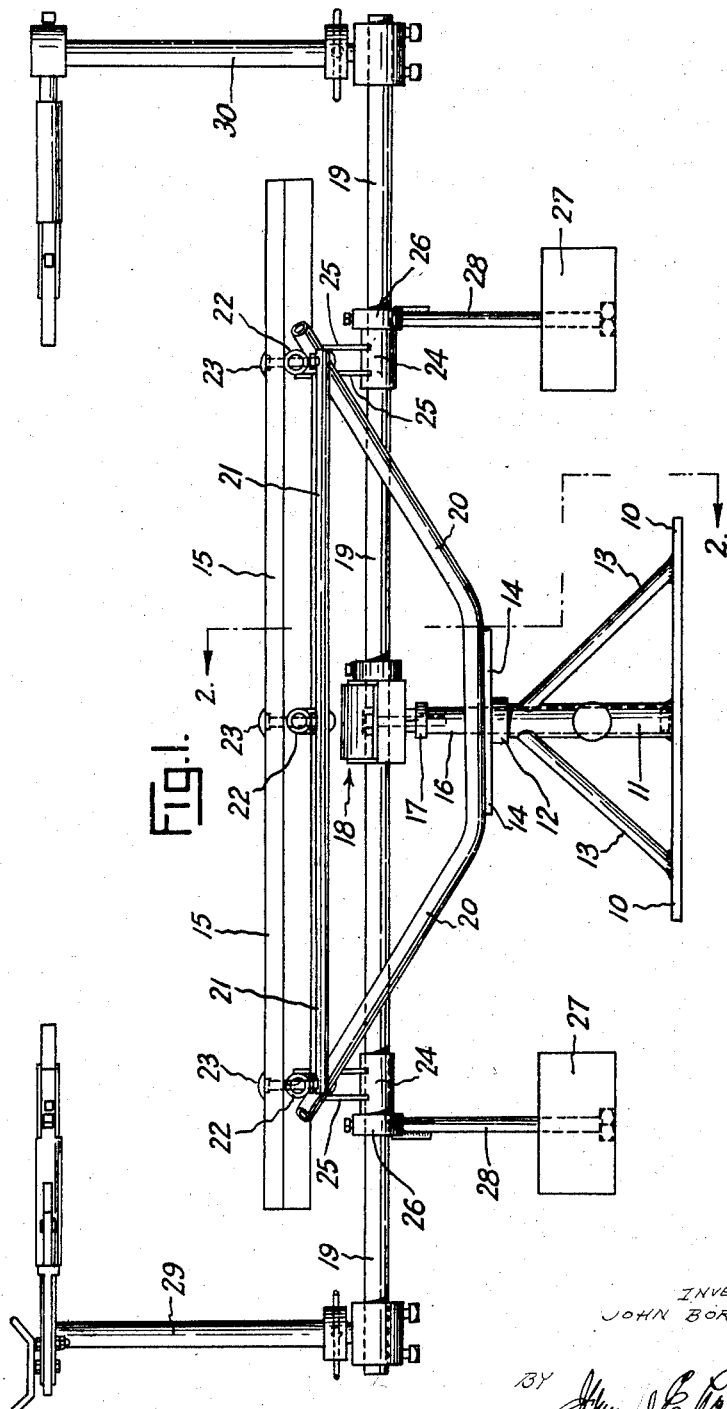

April 8, 1958  J. BORTHWICK  2,829,622
APPARATUS FOR USE IN SHEARING SHEEP
Filed Dec. 14, 1956  2 Sheets-Sheet 2
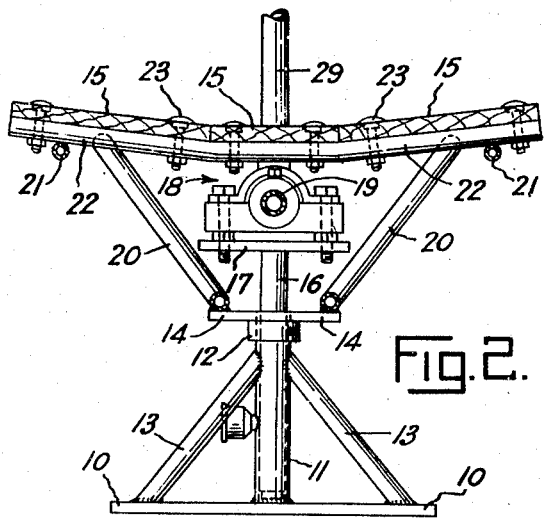
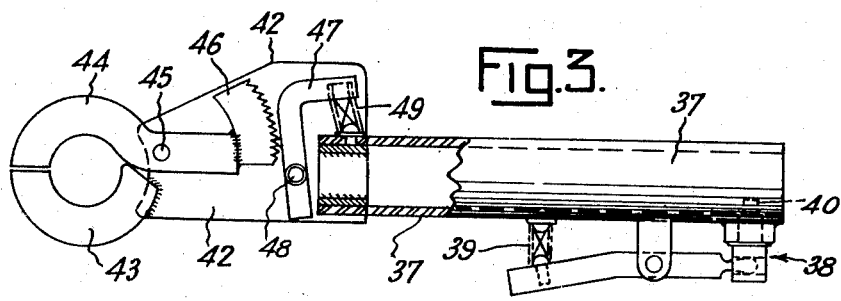
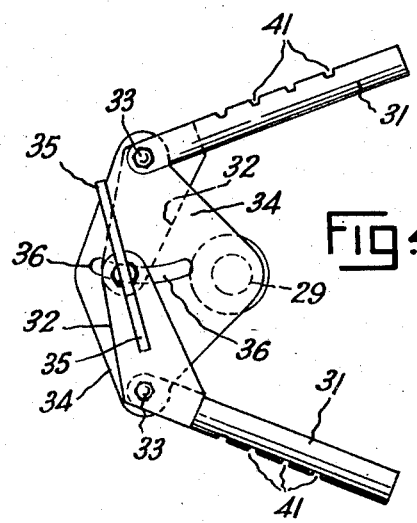
INVENTOR
JOHN BORTHWICK
ATTORNEY

United States Patent Office 2,829,622
Patented Apr. 8, 1958

2,829,622

APPARATUS FOR USE IN SHEARING SHEEP

John Borthwick, Quilpie, Queensland, Australia

Application December 14, 1956, Serial No. 628,347

3 Claims. (Cl. 119—103)

This invention relates to an apparatus for use in shearing sheep, including shackles radially mounted on a main shaft carried by a rotary carriage for securely but releasably holding legs of a sheep in an inverted position, a platform carried by said carriage upon which said sheep is supported and held, means including said main shaft whereby the sheep while held by the shackles and supported by the platform may be tilted as desired for shearing.

Shearing sheep is a skilled occupation; but a considerable part of the skill required in shearing a sheep quickly and effectively lies in the holding of the sheep firmly in the position at the time required, while at the same time applying the clippers.

My invention has been devised with the principal object of providing an apparatus adapted to hold a sheep firmly in a convenient position for shearing, the apparatus including means whereby the position of the sheep may be easily altered as from time to time required, the apparatus enabling sheep to be shorn quickly and effectively by semi-skilled labour.

Another object of the invention is to provide apparatus of the character stated which is of such nature that a sheep may be quickly and easily shackled thereby.

Another object of the invention is to provide apparatus of the type stated which includes means whereby it may be easily adjusted to suit sheep of different sizes.

In order that the invention may be more readily understood reference will now be made to the accompanying drawings wherein:

Figure 1 is a side elevational view illustrating the invention.

Figure 2 is a sectional view on the line 2—2 of Figure 1.

Figure 3 is an enlarged plan view illustrating one of the outer shackle arms and shackle forks for holding a fetlock of an animal to be shorn.

Figure 4 is an enlarged plan view illustrating two inner shackle arms, adjustably connected to a pivot plate.

The base 10 has secured thereto a tubular upright 11 having a turn-table flange 12, said upright being reinforced by four struts 13.

The turn-table flange 12 has a turn-table plate 14 disposed rotatably above it, the said plate 14 forming part of an under carriage assembly which carries a platform 15 upon which the sheep to be shorn is placed and held.

A central vertical shaft 16 is freely rotatable in the said tubular upright 11 and has the said turntable plate 14 secured thereto, the said shaft 16 extends upwardly and has secured thereto also an upper plate 17 upon which a friction resistance member 18 is mounted, and through which a main shaft 19 passes, the purpose of which will be explained later.

The under carriage assembly which rotates upon the turn-table flange 12, is mounted upon the turn-table plate 14 to rotate therewith and includes two diagonal stays 20 which extend upwardly, two longitudinal members 21 and cross pieces 22 which are secured to said diagonal stays 20 at the upper ends thereof, the said platform 15 upon which the sheep to be shorn is secured, is securely attached to the said cross pieces 22, for instance by bolts 23.

The said main shaft 19 is supported in bearings 24 carried by suspension plates 25 descending from said cross pieces 22 as required, see Fig. 1, endwise movement of the said main shaft being prevented by shaft collars 26.

Counter weights 27, two of which are shown in Figure 1, extend from respective pendent shafts 28 the latter being secured to the respective shaft collars 26.

A shackle assembly, see Figs. 1–3 and 4, is adjustably mounted at the respective ends of the said main shaft 19, and includes an upright shackle support 29, disposed adjacent to the head end of the platform and an upright shackle support 30 disposed adjacent to the position occupied by the hind legs of the animal when being shorn.

Shackle or gripping members for securing and adjustably holding the respective hocks of the sheep during the shearing operation are illustrated in Figures 3 and 4 and each comprise an inner shackle member 31 and an outer shackle member 37 capable of engaging in an adjustable manner, to be explained later.

The said inner members 31 of the shackle assembly with respect to the upright shackle support 29 are each provided with an angularly disposed lug 32 and are respectively pivoted by a pivot pin 33 to a plate 34 secured to said shackle support 29 capable of being secured in adjusted position by a thumb screw 35, moveable in an adjusting arcuate slot 36.

The respective inner shackle members 31 are received in the corresponding outer shackle member 37, and are adjustably secured by a pivoted lever catch 38 having a spring 39 and locking pin 40 for engaging slots 41 in the inner shackle member 31.

The outer shackle members 37 each have a head portion 42 provided with an integral gripping portion 43 provided to co-operate with a corresponding medially pivoted gripping portion 44, the latter being mounted upon a pivot pin 45 and having formed integral therewith a toothed quadrant 46 which is adjustably engaged by a pawl member mounted upon a pivot pin 48 and is pressed into engagement with said toothed quadrant 46 by a spring 49.

The inner shackle member 31, which receives an outer shackle member 37 is mounted at the upper end of the said upright shackle support 30.

In using the apparatus, a sheep is placed with its back on the platform 15 with its legs uppermost. The respective legs to be held are then engaged at the coronet portion of the pastern bone by the respective shackle members 43—44, and are so retained by the engagement of the pawl 47 in the toothed quadrant 46 on the pivoted member 44. It will be appreciated that owing to the said shackles being mounted upon the shackle supports 29 and 30, and the latter being adjustaby secured to the main transverse shaft 19, which is capable of radial movement, the desired tilting of the sheep relative to the platform 15, is effected.

I claim:

1. An improved apparatus for use in shearing sheep comprising a substantially horizontally disposed sheep supporting table, rotatable table supporting means upon which said table is mounted, a friction resistance member mounted on said table supporting means, a horizontally disposed main shaft supported within said friction resistance member, a counterweight depending from said main shaft, means for changing and fixing the radial position of said counterweight relative to said main shaft, and shackle assemblies mounted on said main shaft, whereby a sheep held in said shackle assemblies may be moved into a tilted position upon said table and held in such tilted position upon change of the radial position of said counterweight with respect to said main shaft and rotation of said main shaft within said friction resistance means by application of a radial force to said shackle assemblies.

2. An improved apparatus as claimed in claim 1 wherein said shackle assemblies each comprises an upright shackle support mounted on said main shaft, and a pair of shackle members mounted on said respective shackle supports, each of said shackle members comprising a pair of telescoping arms for mutually slidable movement, means for varying and releasably fixing the overall length of said telescoping arms, a split circular leg gripper mounted at the end of said telescoping arms comprising a fixed portion and a pivotable portion, and means for pivoting and holding said pivotable portion into and out of registry with said fixed portion.

3. An improved apparatus as claimed in claim 2 including means for simultaneously swinging said pair of shackle members into a position of greater divergence and for fixing said pair of shackle members in such position.

References Cited in the file of this patent
UNITED STATES PATENTS

| 77,435 | Albert | May 5, 1868 |
| 83,754 | Alwood | Nov. 3, 1868 |

FOREIGN PATENTS

| 158,840 | Australia | Apr. 15, 1954 |